United States Patent
Tani et al.

(10) Patent No.: US 7,057,602 B2
(45) Date of Patent: Jun. 6, 2006

(54) INTERACTIVE CONTROL SYSTEM HAVING PLURAL DISPLAYS, AND A METHOD THEREOF

(75) Inventors: Masayuki Tani, Katsuta (JP); Kimiya Yamaashi, Hitachi (JP); Koichiro Tanikoshi, Hitachi (JP); Masato Horita, Hitachi (JP); Masayasu Futakawa, Hitachi (JP); Harumi Uchigasaki, Katsuta (JP); Atsuhiko Nishikawa, Mito (JP); Atsuhiko Hirota, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 409 days.

(21) Appl. No.: 10/692,808

(22) Filed: Oct. 27, 2003

(65) Prior Publication Data

US 2004/0085257 A1 May 6, 2004

Related U.S. Application Data

(63) Continuation of application No. 10/192,726, filed on Jul. 11, 2002, now abandoned, which is a continuation of application No. 09/619,647, filed on Jul. 19, 2000, now Pat. No. 6,441,802, which is a continuation of application No. 09/374,263, filed on Aug. 16, 1999, now Pat. No. 6,100,857, which is a continuation of application No. 08/969,313, filed on Nov. 13, 1997, now Pat. No. 5,969,697, which is a continuation of application No. 08/230,369, filed on Apr. 20, 1994, now abandoned.

(30) Foreign Application Priority Data

Apr. 28, 1993 (JP) .................................. 5-102159

(51) Int. Cl.
*G09G 5/08* (2006.01)

(52) U.S. Cl. ........................ 345/157; 345/1.1; 715/856
(58) Field of Classification Search ................. 345/1.1, 345/1.3, 2.1, 2.2, 156, 157; 715/856–858
See application file for complete search history.

(56) References Cited

U.S. PATENT DOCUMENTS

| 4,791,478 A | 12/1988 | Tredwell et al. ............. 345/157 |
| 4,942,514 A | 7/1990 | Miyagaki et al. |
| 5,047,754 A * | 9/1991 | Akatsuka et al. ............. 345/1.1 |

(Continued)

FOREIGN PATENT DOCUMENTS

DE 37 09 400 9/1988

(Continued)

OTHER PUBLICATIONS

English translation of "Notification of Reason(s) for Refusal," Reference No. 1193017161; Dispatch No. 506306, Dispatch Date Sep./25/Heisei 13 Nen (2001).

(Continued)

*Primary Examiner*—Regina Liang
(74) *Attorney, Agent, or Firm*—Kenyon & Kenyon LLP

(57) ABSTRACT

An interactive computer system with plural displays includes a first computer, having an input device and an output including a display and a second computer having an output including display coupled to the first computer.

A voice recorder is provided to create an icon representing a recorded voice, and the icon is displayed on the display of the first computer. The input device of the first computer, which may be a mouse, is adapted to drag the icon from the display of the first computer to the display of the second computer, and to reproduce the recorded voice in response to a pointer displayed on the displays and controlled by the input device.

2 Claims, 18 Drawing Sheets

U.S. PATENT DOCUMENTS

| | | | |
|---|---|---|---|
| 5,418,548 A | 5/1995 | Fukishi | 345/1 |
| 5,491,743 A | 2/1996 | Shiio et al. | 348/15 |

FOREIGN PATENT DOCUMENTS

| | | | |
|---|---|---|---|
| DE | 38 38 937 | | 6/1989 |
| DE | 39 30 581 | | 3/1991 |
| EP | 0 467 720 | * | 1/1992 |
| JP | 54-121379 | | 9/1979 |
| JP | 62-074119 | | 4/1987 |
| JP | 62-249276 | | 10/1987 |
| JP | 63-308681 | | 12/1988 |
| JP | 01-103759 | | 4/1989 |
| JP | 02-039307 | | 2/1990 |
| JP | 02-156310 | | 6/1990 |
| JP | 02-273857 | | 11/1990 |
| JP | 03-045991 | | 2/1991 |
| JP | 03-071187 | | 3/1991 |
| JP | 03-075693 | | 3/1991 |
| JP | 03-156557 | | 7/1991 |
| JP | 4(1992)-491 | | 1/1992 |
| JP | 04-218293 | | 8/1992 |
| JP | 04-314153 | | 11/1992 |
| JP | 04-335698 | | 11/1992 |
| JP | 05-046559 | | 2/1993 |
| WO | WO 91/06960 | | 5/1991 |

OTHER PUBLICATIONS

M. Elwart-Keys et al., *User Interface Requirements for Face to Face Groupware*, CHI '90 Proceedings, Apr., 1990, pp. 295-301.

E. Bier et al., *MMM: A User Interface Architecture for Shared Editors on a Single Screen*, UIST'91, Hilton Head, SC, Nov. 11-13, 1991, pp. 79-86.

M. Stefik et al., *ACM Transactions on Office Information Systems*, 5:2, Apr. 1987, pp. 147-167.

S. Feiner et al., *Hybrid User Interfaces: Breeding Virtually Bigger Interfaces for Physically Smaller Computers*, UIST'91, Hilton Head, DC, Nov. 11-13, 1991, pp. 9-17.

Klaus Zinser; DE Journal: *atp-Automatisierungstechnische Praxis* 32 (1990) 12, pp. 579-585K.

Herbst et al.; DE Journal: *VGB Kraftwerkstechnik* 69, vol. 6, Jun. 1989, pp. 562-569.

* cited by examiner

FIG. 9

| INPUT DEVICE ID | CHARGED TASK |
|---|---|
| MOUSE 12 | OPERATION |
| KBD 13 | OPERATION |
| HEAD SET 14 | OPERATION |
| MOUSE 32 | INSPECTION |
| KBD 33 | INSPECTION |
| HEAD SET 34 | INSPECTION |
| MOUSE 52 | CHIEF ON DUTY |
| ⋮ | ⋮ |

| CHARGED TASK | OUTPUT DEVICE ID |
|---|---|
| OPERATION | DISPLAY 10 |
| OPERATION | HEAD SET 14 |
| INSPECTION | DISPLAY 30 |
| INSPECTION | HEAD SET 34 |
| CHIEF ON DUTY | DISPLAY 50 |
| ⋮ | ⋮ |

121

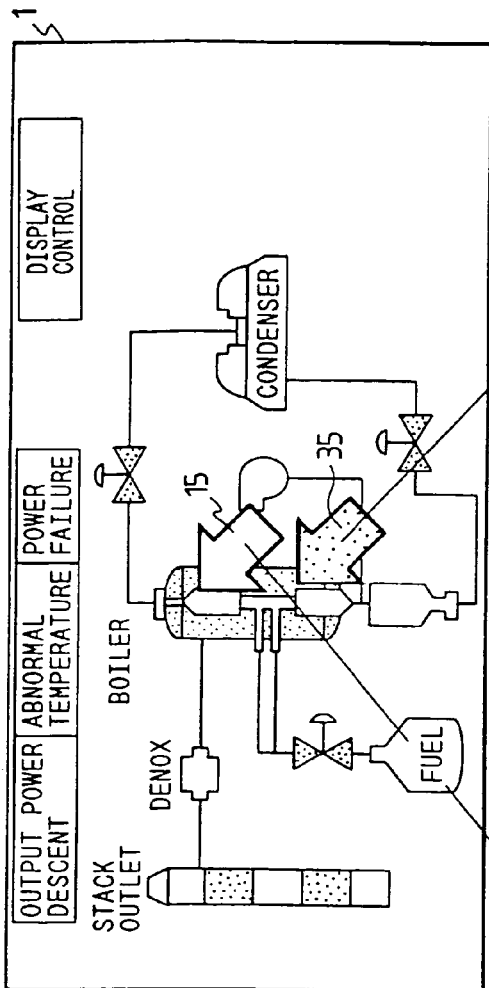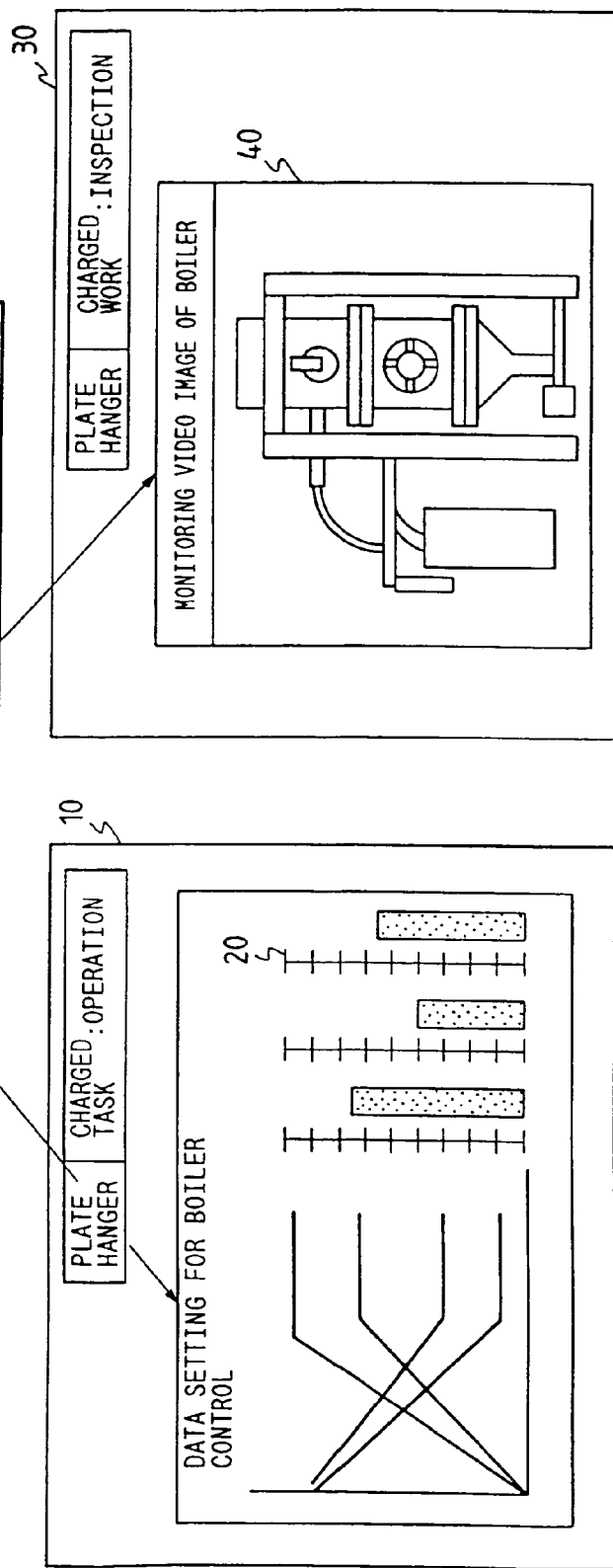
FIG. 11

| INPUT EVENT | | | EXECUTING PROCESS | |
|---|---|---|---|---|
| KIND OF OPERATION | BUTTON NUMBER | CHARGED TASK | ROUTINE | OUTPUT |
| BUTTON RELEASE | 1 | OPERATION | DisplayBoilerData() | AT HAND OF OPERATOR |
| BUTTON RELEASE | 1 | INSPECTION | DisplayBoilerVideo() | AT HAND OF INSPECTOR |
| ... | ... | ... | ... | ... |

130

131 — CHIEF ON DUTY (0)
— OPERATOR IN CHARGE (1)
— INSPECTOR IN CHARGE (0)

INTERACTIVE CONTROL SYSTEM HAVING PLURAL DISPLAYS, AND A METHOD THEREOF

CROSS-REFERENCE TO RELATED APPLICATIONS

This is a continuation of application Ser. No. 10/192,726 filed 11 Jul. 2002, now abandoned which is a continuation of application Ser. No. 09/619,647 filed Jul. 19, 2000, now U.S. Pat. No. 6,441,802 which is a continuation of application Ser. No. 09/374,263 filed Aug. 16, 1999, U.S. Pat. No. 6,100,857, which is a continuation of application Ser. No. 08/969,313 filed Nov. 13, 1997, U.S. Pat. No. 5,969,697, which is a continuation of application Ser. No. 08/230,369 filed Apr. 20, 1994, abandoned.

BACKGROUND OF THE INVENTION (1) Field of the Invention

The present invention relates to an interactive processing apparatus for interactive processing of plural displays, and a method thereof.

(2) Description of the Prior Art

Current monitoring and controlling systems have a large display installed in front of operators in order to display overview information such as a system configuration map of a total system, alarms for indicating that something unusual is occurring, for allowing all the operators to grasp a condition of the system at a glance at any time. On the other hand, a display at hand prepared for respective operators displays integrally more detailed information. The amount of the detailed information displayed on each display at hand is numerous, and it is not rare to reach hundreds of images in a large scale system.

The operators monitor using both the large display and their display at hand. The operators grasp entire system states by watching the overview information on the large display, and when an abnormal condition is detected, they examine more detailed data by using their own display at hand and perform necessary control operation.

However, because information displayed on the large display and information shown in displays at hand are independently controlled, a conventional system required a complex operation to provide the necessary information to both in connection with each other. For instance, when a warning lamp blinks on the large display, the operators must retrieve an image displaying control data for the warning from hundreds of images by selecting menu repeatedly. Therefore, there has been a problem of a delayed response to an emergency such as an abnormal condition occurrence or an accident.

SUMMARY OF THE INVENTION (1) Objects of the Invention:

One of the objects of the present invention is to provide a man-machine interface which is capable of referring related detailed information just by designating an objective on the large display. For instance, a man-machine interface such as the one wherein detailed information on a warning and control data related to it are displayed in a display at hand just by pointing to a blinking warning on the large display, and control data and setting devices related to an apparatus are displayed on a display at hand only by pointing to the apparatus in a system configuration map on the large display.

When realizing such a man-machine interface as the one above described, an important point to be considered is that the large display is shared by a plurality of operators. A monitoring and controlling system is operated by collaboration of plural operators, each of them is in charge of a different operation respectively, such as an operator in charge of operation, an operator in charge of maintenance and inspection, and a chief on duty for controlling total operation. Accordingly, the large display is shared by operators who perform different tasks simultaneously, which is different from a case of display at hand which is prepared for individual operators. Therefore, the above described interface must satisfy the following requirements:

(1) No disturbance to other operator's operation:

There is a possibility to hide information which has been watched by other operators when information necessary for only a specified operator is displayed arbitrarily on the large display.

(2) Simple retrieval of information necessary for individual tasks by respective operators:

Necessary information differs depending on contents of the charged task. For example, when a warning light indicating an abnormal condition of a boiler blinks, an operator in charge of operation examines control data such as a flow rate of fuel, while an operator in charge of maintenance examines an inspection record of the boiler. Accordingly, it is necessary for operators to be able to quickly retrieve information necessary for them without being distracted by information for others.

(3) An operating environment suitable for tasks assigned to each operator:

Commands used frequently and permission for operation differ depending on the task charged to respective operators. Accordingly, it is desirable that the operating environment such as a structure of menu and an operable range of operation can be customized for respective operators.

The object of the present invention is to provide a man-machine interface which satisfies the above requirements.

(2) Methods of Solving the Problems:

In accordance with the present invention, the above described objects can be realized by providing a registering means for registering an attribute of a respective operator to an input means, a process selecting means for selecting process contents based on the attribute responding to a process request from the input means, and an executing means for executing a process selected by the process selecting means and outputting to an output means selected based on the attribute, to an interactive processing apparatus having a plurality of input means and a plurality of output means.

An operator registers his own attribute, for example, charged task, etc, to his operating input means using the registering means. When the operator requests a process for displaying related information and menu from the input means, the process selecting means examines the operator's attribute which has been registered in the input means, and selects a process corresponding to the attribute. The executing means executes the process selected by the process selecting means, and outputs a result of the execution to an output device matched to the attribute, for example, a display at hand of the operator. In accordance with the execution of the process based on the operator's attribute, displaying only necessary images for the operator and providing convenient operating environment for the operator to operate in, can be realized. Furthermore, the operator can execute a necessary process without disturbing other operators' operation by selecting an output device based on the operator's attribute.

BRIEF DESCRIPTION OF THE DRAWINGS

FIG. 9 is a drawing indicating a corresponding table of input device identification (ID) and registered charged task.

FIG. 10 is a drawing indicating a corresponding table of registered charged task and output device identification (ID).

FIG. 11 is an example of image manner displayed on the large display 1 and the displays at hand 10, 30.

DETAILED DESCRIPTION

Embodiments of the present invention are explained hereinafter with reference to the drawings.

Figure 1:
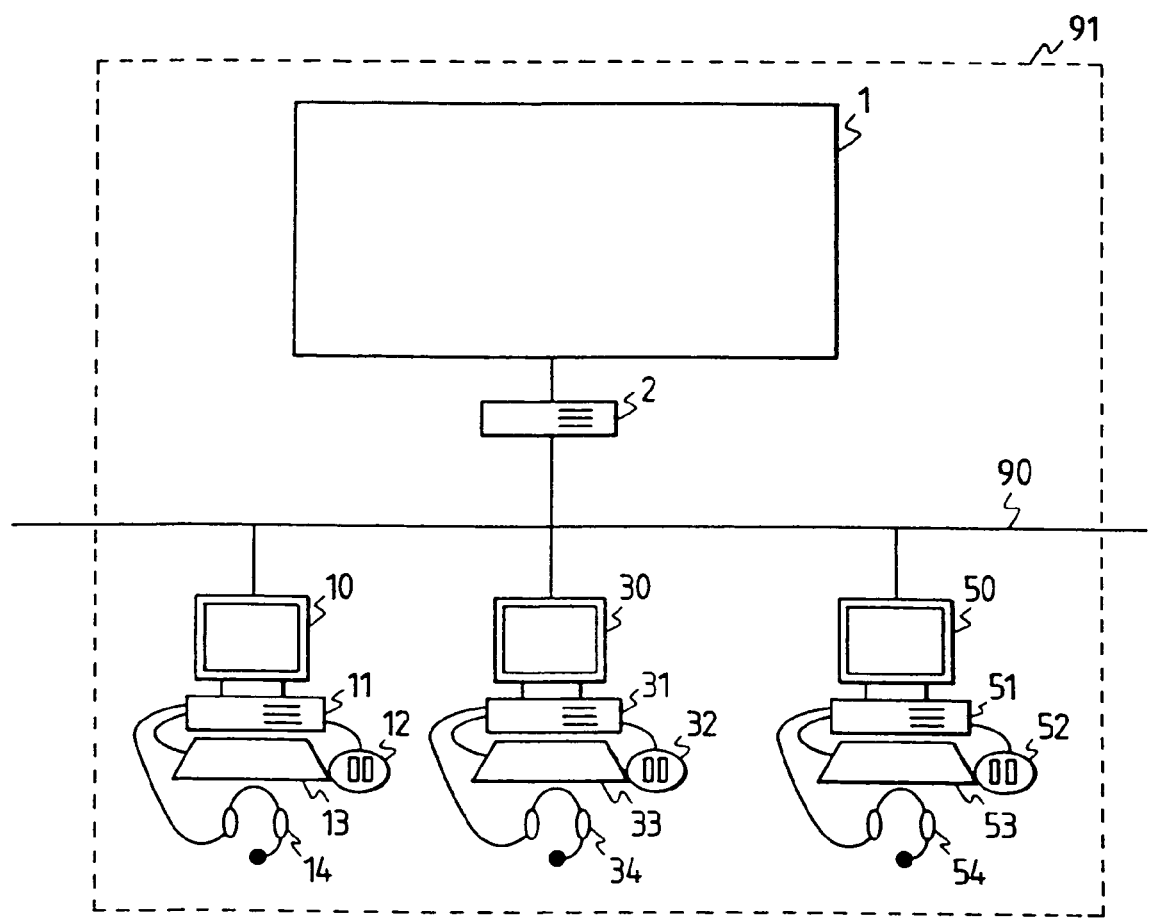
FIG. 1 is a schematic total overview indicating structure of the plant monitoring and controlling system 91 in accordance with the present invention.

FIG. 1 indicates a total structure of the plant monitoring and controlling system 91 which is one of the embodiments of the present invention. The numeral 1 indicates a large display whereon overview information on a whole plant (system diagram, main warnings, important control data, main monitoring video image, etc.) is displayed. The display on the large display 1 is performed by a workstation 2. Each of the displays 10, 30, 50 is placed at hand of a respective operator who is engaged in operation of the plant. Hereinafter, the displays 10, 30, 50 are called in general as displays at hand. The operators grasp status of the whole plant by watching the overview information displayed on the large display 1, examine detailed data using the individual display at hand if an abnormal symptom is found, and perform a setting operation, if necessary. The displays in the respective displays 10, 30, 50 are performed by workstations 11, 31, and 51, respectively. Mice 12, 32, 52, key boards 13, 33, 53, and headsets 14, 34, 54 are connected to the workstations 11, 31, and 51, respectively. Operators point a position in the displays at hand 10, 30, 50 and on the large display 1 using the mice, respectively. The headset is a headphone having a microphone. The operator hears sound output from the system and inputs sound signal to the system using the headset. Furthermore, the workstations 2, 11, 31, 51 are mutually connected via a local area network 90, and mutual information exchange is possible. To the local area network 90, various computers for controlling, controllers for apparatus (not shown in the drawing) are connected directly or indirectly via other networks, the workstations 2, 11, 31, 51 are accessible to various control information on the plant through the local area network 90.

In FIG. 1, three displays at hand 10, 30 50 are illustrated. However, the number of the displays can be changed naturally depending on the number of the operators. Although FIG. 1 indicates one large display, a plurality of the large displays can also be used. The large display composed by joining a plurality of displays in a seamless manner may be used. Furthermore, providing a speaker and a microphone instead of the headphone to each of the operators may be acceptable.

Figure 22:
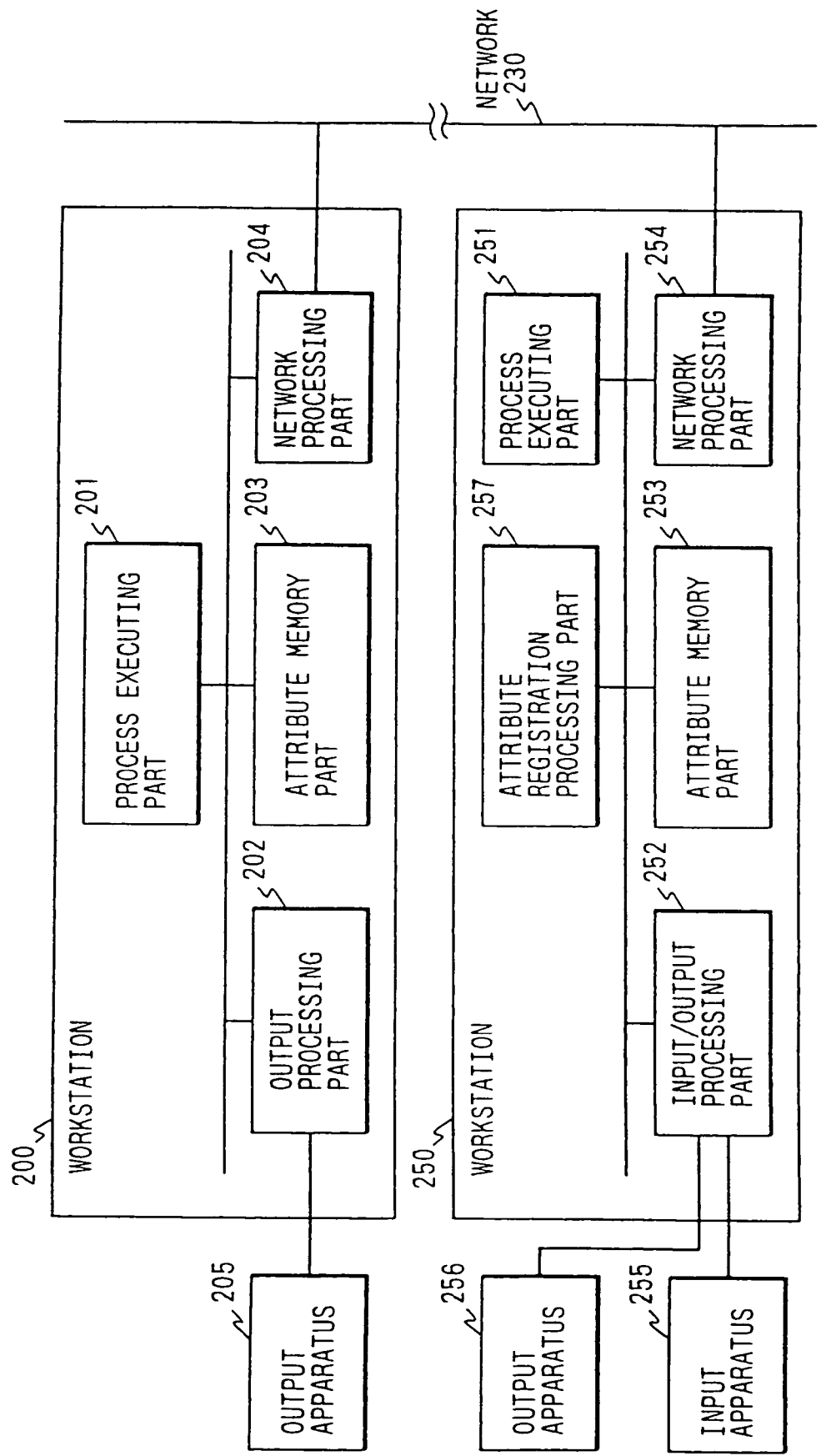
FIG. 22 is a schematic drawing indicating an example of a system structure of the present invention.

A concept of the present invention is explained referring to FIG. 22. In FIG. 22, the workstation 200 and the workstation 250 are connected to the network 230, and the two workstations can exchange information arbitrarily with each other. To the workstation 250, other workstations having the same structure as the workstation 250 are connected (not shown in FIG. 22). The process executing part 201 of the workstation 200 outputs information to output apparatus of the other workstations connected to the network 230 as well as displaying information in the output apparatus 205 via the output processing part 202.

To the workstation 250, an attribute is registered at the start of the operation. The attribute registration processing part 257 displays a menu for the attribute registration in the output apparatus 256 via the input/output processing part 252. When the menu is selected by the input apparatus 255, the attribute registration processing part 257 registers the selected attribute to the attribute memory part 253, and further, stores a corresponding relationship between the selected attribute and the output apparatus 256 to the attribute memory part 203 of the workstation 200 via the network 230.

Input information from the input apparatus 255 is transmitted to the process executing part 251 via the input/output processing part 252. The process executing part 251 executes a responding process and outputs results of the execution to the output apparatus 256 when the input information is such to a designate a position in a display of the output apparatus 256. On the other hand, when the input information is such as designating a position in a display of the output apparatus 205, the process executing part 251 transmits the input information with an attribute called out from the attribute memory part 253 to the process executing part 201 of the workstation 200. The process executing part 201 executes a process corresponding to the transmitted input information and the attribute. The process executing part 201 transmits results of the execution to an output apparatus corresponding to the transmitted attribute which is called out from the attribute memory part 203.

Figure 2:
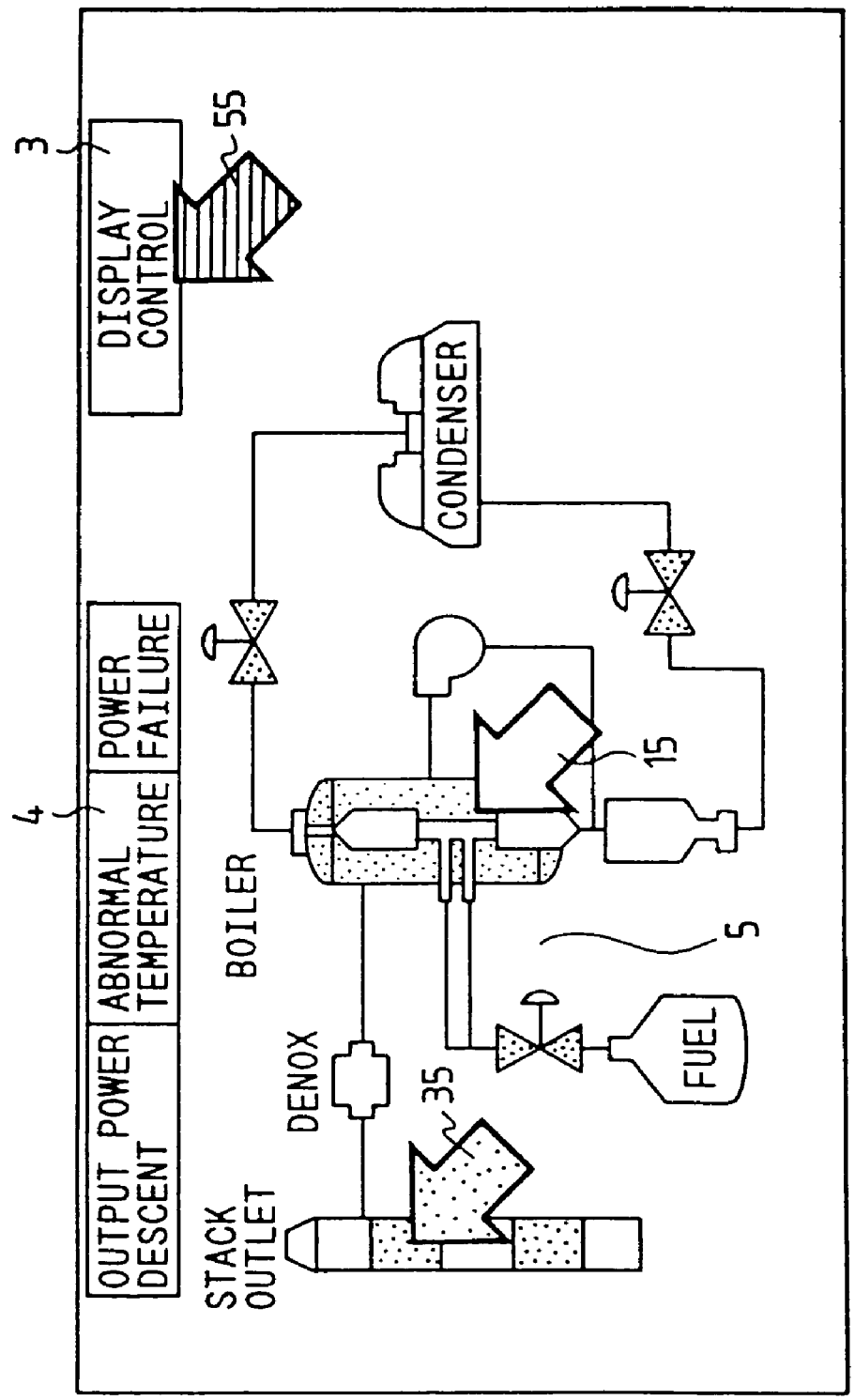
FIG. 2 is an example of image manner displayed on a large display 1.

FIG. 2 illustrates an example of display manner on a large display 1. On the large display 1, overview information such as a system diagram 5 and warnings 4 on the plant is displayed. When an abnormal condition of the plant is detected, a warning 4 related to the abnormal condition blinks. Especially, when the abnormal condition is serious, warning sound alarms from the headsets 14, 34, 54 in addition to the blinking of the warnings 4. The numeral 3 designates a display controlling menu for controlling the display on the large display 1. By selecting the display controlling menu 3, the large display can display various images such as (1) prior displayed objects, (2) subsequent display objects, (3) weather information, (4) monitoring video image, (5) various system diagrams, etc. Each of pointers 15, 35, 55 works with each of the mice respectively, and/or is colored with different colors so as to facilitate identification. The pointers 15, 35, 55 naturally may have shapes different from one another, or may be added with information on operator's attribute, such as name of work, or personal name, instead of color coding. The pointers 15, 35, 55 can be transferred continuously between the displays at hand 10, 30, 50 and the large display 1, respectively. The transferring of the pointers will be explained in detail referring to FIGS. 4–6 later.

Figure 3:
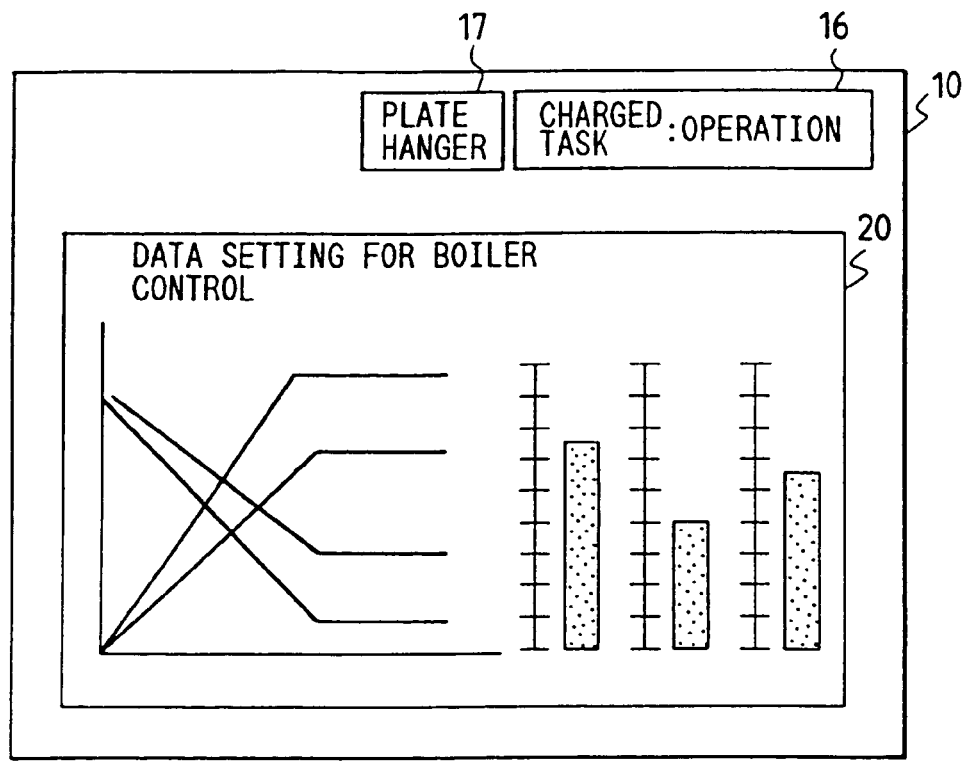
FIG. 3 is an example of image manner displayed in a display at hand 10.

FIG. 3 illustrates an example of display manner on the display at hand 10. Hereinafter, an embodiment is explained taking the display at hand 10 as an example, but the explanation can be applied to other displays at hand 30, 50 if any exception is not mentioned especially. FIG. 3 indicates an example of detailed information on the plant displayed on the display at hand 10. On the display at hand 10, a plate hanger icon 17 and a person in charge icon 16 are displayed. The plate hanger icon 17 provides a function to put a memorandum by voice to the display at hand 10 and the large display 1. The person in charge icon 16 provides a function to register charged task (operator, inspector, chief on duty, etc.) of an operator who uses input/output apparatus at hand, such as display at hand 10, a mouse 12, a keyboard 13, and a headset 14. On the person in charge icon 16, the registered charged task, that means the charged task to the operator who uses the display 10 at the time, is displayed. In the case shown in FIG. 3, "operator" is displayed on the icon 16. It means an operator in charge of operation is registered.

Figure 4:
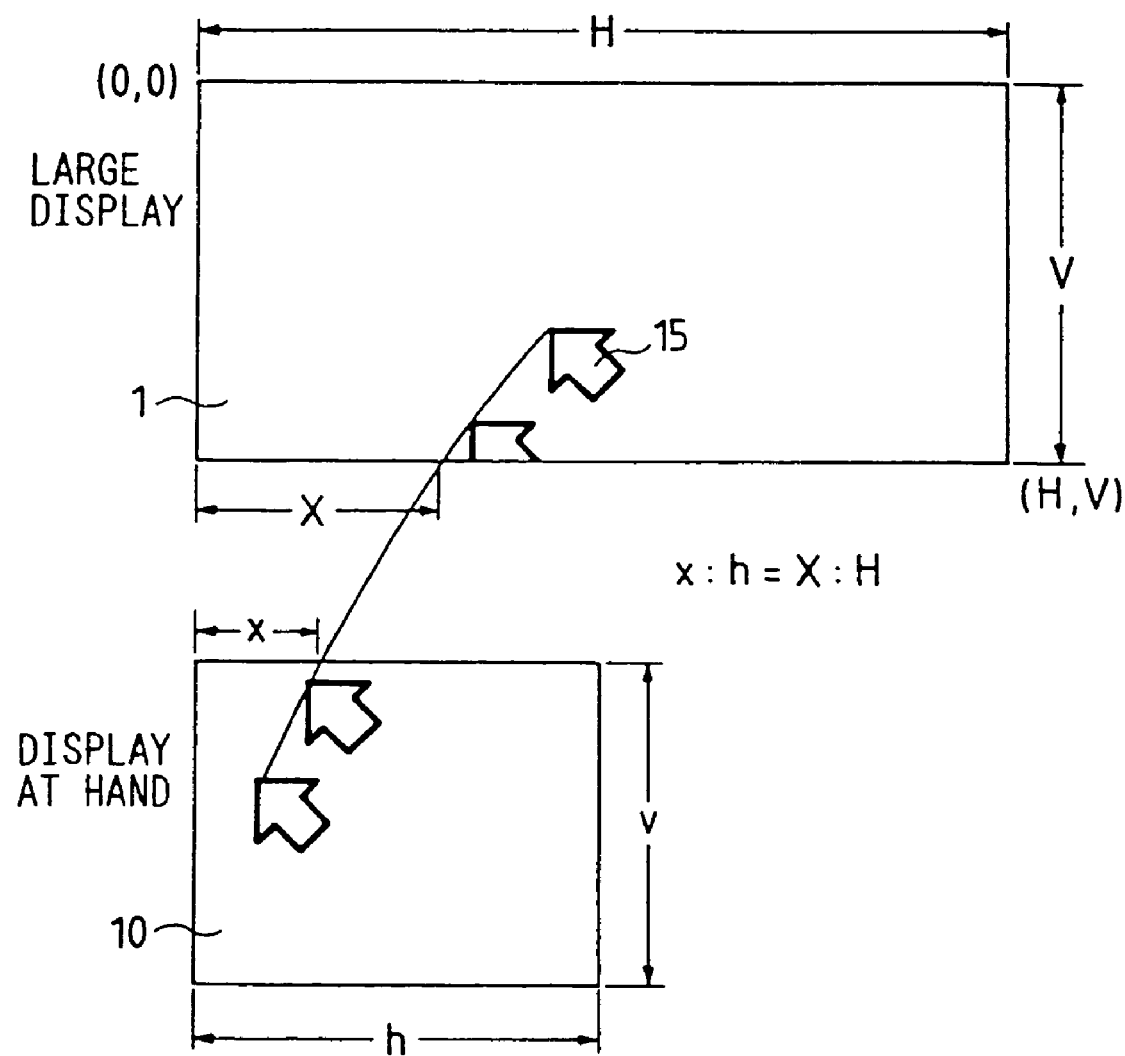
FIG. 4 is an example of moving manner of a pointer between the display at hand 10 and the large display 1.
Figure 5:
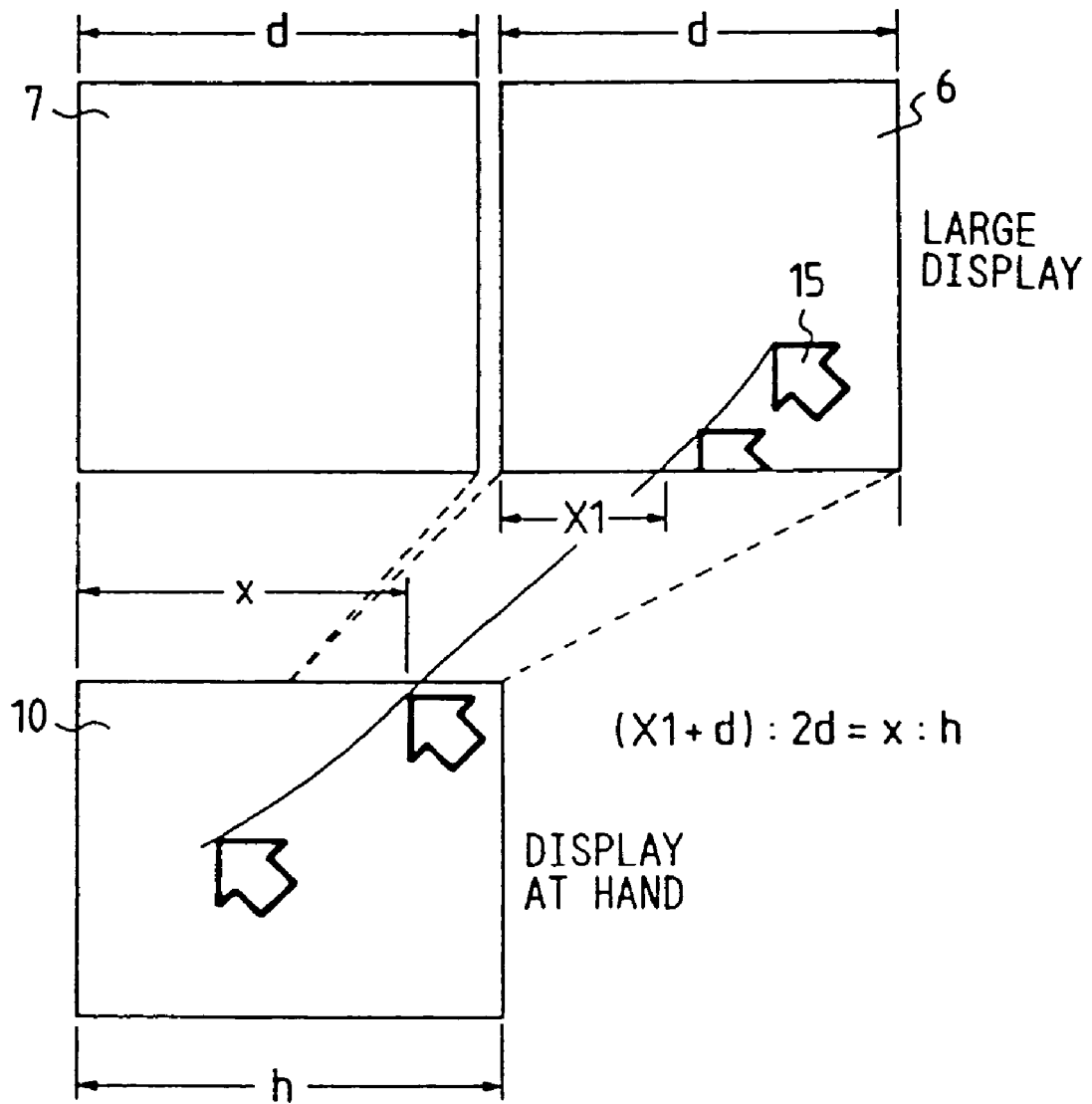
FIG. 5 is an example of moving manner of a pointer between the display at hand 10 and the large display 1.
Figure 6:
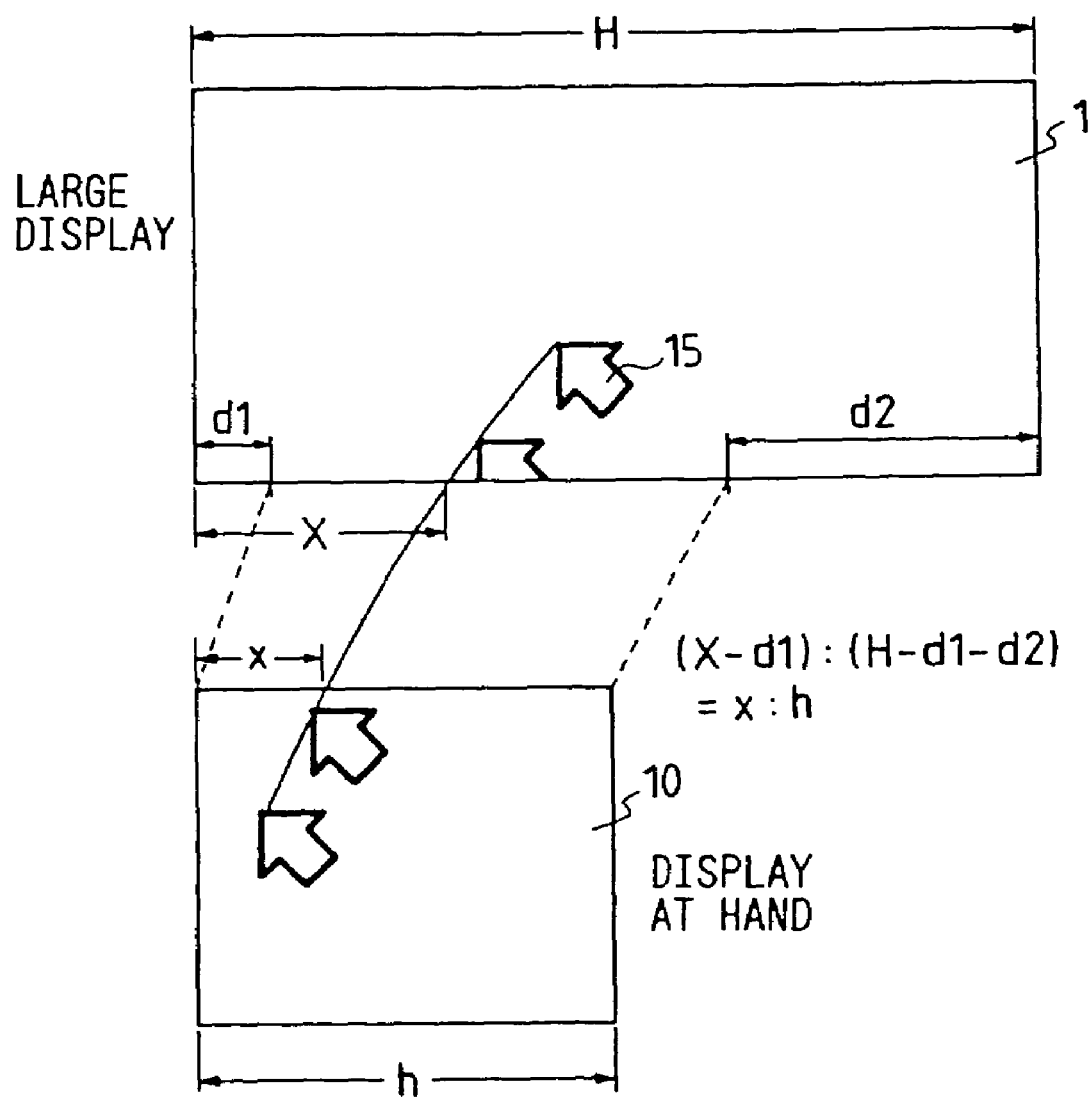
FIG. 6 is an example of moving manner of a pointer between the display at hand 10 and the large display 1.

Next, a method for transferring the pointer 15 between the large display 1 and the display at hand 10 is explained referring to FIGS. 4–6. In the present embodiment, the pointer moves continuously from the display at hand to the large display 1 only by moving the mouse 12 forward as shown in FIG. 4. That means, under a condition wherein the pointer located on the display at hand 10, the pointer 15 moves toward upper portion of the display at hand 10 in accordance with moving the mouse 12 forward, and reaches finally at the uppermost point of the display at hand 10. If moving the mouse 12 forward further, the pointer 15 transfers to the lowest point of the large display 1, and the pointer 15 moves upward to the top of the large display in accordance with further moving the mouse 12 forward. On the contrary, if the mouse 12 is moved backward under a condition wherein the pointer 15 is displayed on the large display 1, the pointer 15 moves downward to the lowest point of the large display 1. If moving the mouse 12 backward further, the pointer 15 transfers to the uppermost point of the display at hand 10. Display position of the pointer 15 at a moment when the pointer 15 transfers from the display at hand 10 to the large display 1 is decided as shown in FIG. 4. That is, when putting x for a horizontal position of the pointer 15 at the moment of transferring from the display at hand 10 to the large display 1, h for the number of pixels in a horizontal direction on the display at hand 10, X for a horizontal position of the pointer 15 at the moment of entering into the large display 1, and H for the number of pixels in a horizontal direction, the X is decided so as to be x:h=X:H. Similarly, when the pointer transfers from the large display 1 to the display at hand 10, x is decided so as to be x:h=X:H.

When the large display is composed of a plurality of displays, the display position of the pointer 15 is decided in the same manner as explained referring to FIG. 4 taking an assumption that the plurality of displays are joined in a seamless manner. FIG. 5 illustrates a case when the large display is composed of two displays 6, 7. When putting d for width of each display of the two displays, X or x can be obtained by replacing X with (X1+d), and H with 2d.

Referring to FIG. 4, a method for transferring the pointer 15 as if the top portion of the display at hand 10 joins the total span of the lower portion of the large display 10 has been explained. However, a method for transferring the pointer 15 as if the top portion of the display at hand 10 joins the partial span of the lower portion of the large display can also be useful. A range of the partial lower span of the large display to be joined to the display at hand 10 can be decided in consideration of a relative relationship of an arrangement between the large display 1 and the display at hand 10. That means, when the display at hand 10 is arranged at left side to the large display 1, X and H are substituted by (X−d1) and (H−d1−d2), respectively, so that the pointer 15 transfers within a ranged d1 the at left side of the lower portion of the large display. Here, d2 is a distance from the right side of the large display 1 to right side of the display at hand 10 when the right side of the display at hand 10 is arranged at the right side of the large display 1. On the contrary, when the display at hand 10 is arranged at the right side of the large display 1, the pointer 15 is arranged so as to transfer at a right side range of the bottom of the large display 1.

The image size (the number of pixels) of the pointer 15 may be changed in the large display 1 from that in the display at hand 10. Especially, when the display at hand 10 and the large display are installed far apart. Making the display size of the pointer 15 larger facilitates identification. For instance, the pointer 15 is displayed with pixels 16.times.16 on the display at hand 10, and with pixels 36.times.36 in the large display 1.

According to the above selection, the pointer becomes easily recognizable even in the far away large display.

Advantages of the above described method are as follows:

(1) a position on the display at hand 10 and the large display 1 can be designated continuously without changing grip of a pointing device;

(2) interactive operation of the large display can be performed with the same feeling as that of operation of the display at hand 10;

(3) depending on the above advantage (2), learning of operation is easy.

At the start of operation of a system in the present embodiment, an operator registers his own charged task to the system. The system provides service based on the registered charged task. The service includes, for example, arranging a suitable operation environment for the charged task, facilitating to retrieve information only necessary for the charged task, and setting a permission for operation for each of the charged task. Here, the operation environment means items in a menu, an order of its arrangement, setting of default, and setting a permission for operation, etc.

Figure 7:
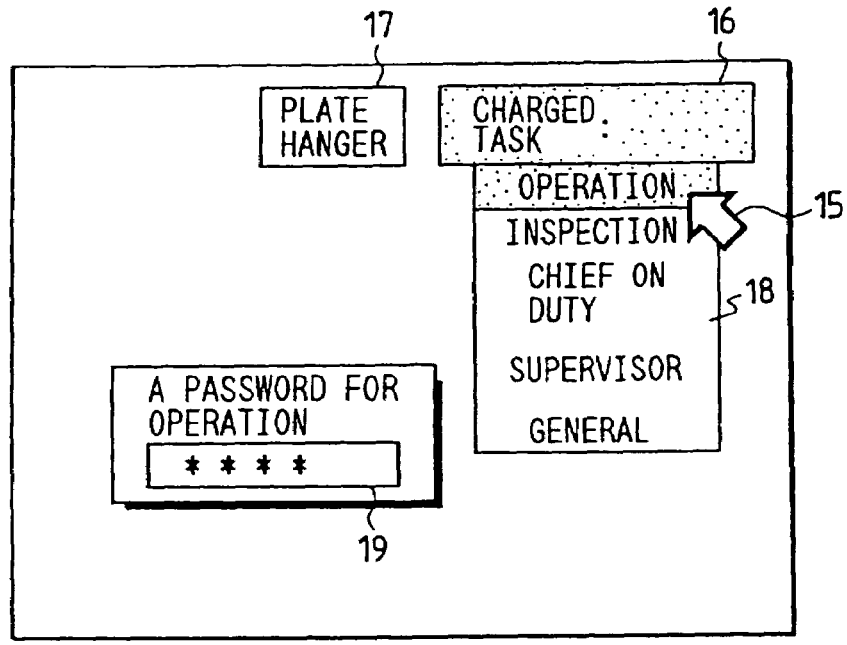
FIG. 7 is an example of image manner at registering charged task.
Figure 8:
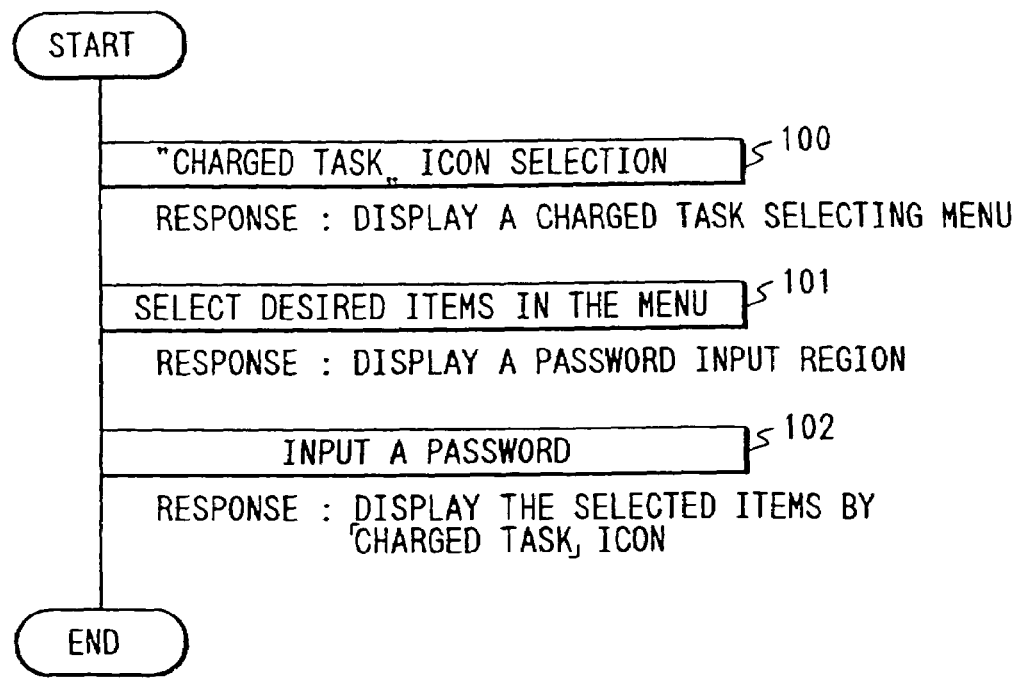
FIG. 8 is a problem analysis diagram (PAD) indicating steps for registering charged task.

A method for registering the charged task is explained hereinafter with reference to FIGS. 7 and 8. FIG. 7 is an example of image manner at registering charged task. FIG. 8 is a problem analysis diagram (PAD) indicating steps for registering charged task. When the charged task icon 16 on the display at hand 10 is indicated by the mouse 12 (step 100), the charged task selecting menu 18 is displayed on the display at hand 10. Items in the charged task selecting menu are as follows:

Operation: Selected when a service for a person in charge of operation is desirable.

Inspection: Selected when a service for a person in charge of inspection is desirable.

Chief on duty: Selected when a service for a person in charge of chief on duty is desirable.

Supervisor: Selected when a service for a person responsible for all task is desirable. This item is selected, for example, at adjusting the system, or operating the system by only one person.

General: Selected for a service within a range of task which does not cause serious disturbance to the system even though erroneous operation is executed. This item is selected, for example, when the system is operated by a person who is not familiar with the system for on-job training.

When a desired item in the charged task selecting menu 18 is selected by the mouse 12 (step 101), a password input region 19 is displayed. When a password which is designated to each of the charged task is input (step 102), the charged task for the operator is registered to the system, and the registered charged task is displayed in the charged task icon 16. When the charged task must be changed, the same procedure as that of the registering (FIG. 8) is performed.

In the system of the present embodiment, a correspondence of the charged task for the operator and input/output devices used by the operator is controlled using tables shown in FIGS. 9 and 10. In FIG. 9, a table 120 indicating correspondence between input device IDs, such as mice 12, 32, 52, keyboards 13, 33, 53, and headsets 14, 34, 54, and the charged task for the operator who uses the input devices is utilized for retrieving the charged task for the operator using the input devices with the input device IDs as keys.

In FIG. 10, a table 121 indicating correspondence between the charged task for the operator and output device IDs, such as displays at hand 10, 30, 50, and headsets 14, 34, 54, used by the operator is utilized for retrieving the output devices used by the operator by using the charged task as keys.

Referring to FIG. 11, an example of utilizing manner of the plant monitoring and controlling system 91 is explained hereinafter.

When an operator points out an image displayed on the large display 1 by a mouse at hand, detailed information related to the pointed image and necessary for the task charged to the operator is displayed in the operator's displays at hand 10, 30, 50. FIG. 11 illustrates a status wherein the display at hand 10 is used by an operator in charge of operation, and the display at hand 30 is used by an operator in charge of inspection. When the operator in charge of operation points out a boiler in a system diagram displayed on the large display 1 by the mouse 12, a display 20 for setting control data for the boiler is displayed on the display at hand 10, and an operation procedure of the boiler becomes operable. On the other hand, when the operator in charge of inspection points out the boiler in the same system diagram displayed similarly on the large display 1, monitoring video image of the boiler in the plant site is displayed on the display at hand 30, and the condition of the boiler at the plant site can be inspected.

FIG. 11 shows an example of displaying information 22 in the displays at hand 10, 30, 50 responding to pointing on the large display 1. However, the information can be output in sound. Even in a case when the information is output in sound, the information is output to only a person who needs the information. For instance, when the operator in charge of operation points out a display on the large display 1 by the mouse 12 at hand, the information related to the display is output to the headset 14 provided to the operator in charge of operation in sound. Furthermore, not only information, but also sound feed back to the operation on the large display 1 is output to only the operator. For instance, when a sound signal is fed back at every pointing, the feed back is output to only the headset 14 for the operator who has pointed, but not to the headsets for the other operators. That means, when the operator in charge of operation points a display on the large display 1 by the mouse 12 at hand, a sound signal is output to the headset 14 provided to the operator in charge of operation.

An error message to an erroneous operation on the large display 1 is also output to the display at hand 10 or the headset 14 only for the operator who has operated. Of course, the error message which must be referred to other operators is output to the other operators.

As explained above, information related to the displayed information on the large display 1 can be referred easily by pointing out the display by the mouse 12 at hand. And, the information is output only to the output device for the operator who has pointed out the display, and consequently, the operation does not distract other operators. The large display is used commonly with many operators. Therefore, if information necessary for only a specified operator is displayed on the large display 1, it may hide information which has been watched by other operators. In a case when a sound is output, if the sound is output loudly so as to reach all operators, it may distract operators who do not need the information. Furthermore, by displaying only information selected so as to correspond to the charged task for the operator who has pointed out, the operator can easily access the information necessary for only himself without being distracted by information to other operators.

The large display 1 is used commonly by a plurality of operators who are in charge of different tasks. Because a suitable operation environment for performing each of the tasks differs, the plant monitoring and controlling system 91 provides an operation environment corresponding to the charged task for each of the operators who use the large display 1 for interactive operation.

Figure 12:
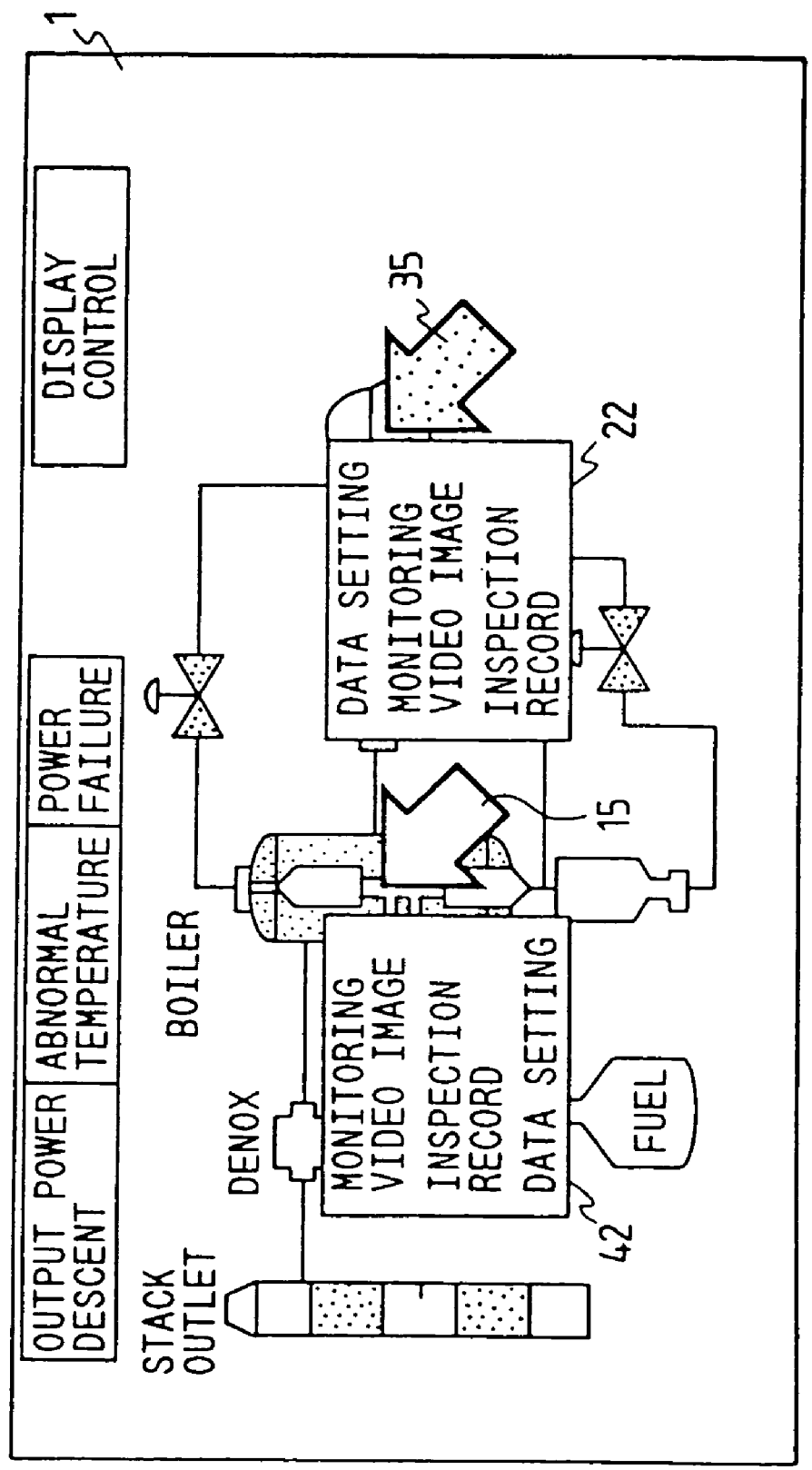
FIG. 12 is an example of image manner displayed on the large display 1.

FIG. 12 illustrates an example of changing an arranging order of the menu items corresponding to the charged task of the operator. The numeral 22 indicates a menu displayed when the operator in charge of operation must point out any one of symbols in the system diagram 5 displayed on the large display 1 by the mouse 12. By selecting the menu 22, any one of the information related to the pointed symbol such as data setting, monitoring video image, and inspection record, is displayed on the display at hand 10. Here, the items in the menu 22 are arranged from the top to the bottom in an order based on frequency of selection by the operator in charge of operation. On the other hand, the menu 42 is displayed by pointing out any one of the symbols in the system diagram 5 by the inspector. The items in the menu 42 are the same as those of the menu 22, but the items are arranged from the top to the bottom in an order based on frequency of selection by the inspector, that is, an order of monitoring video image, inspection record, and data setting.

Figure 13:
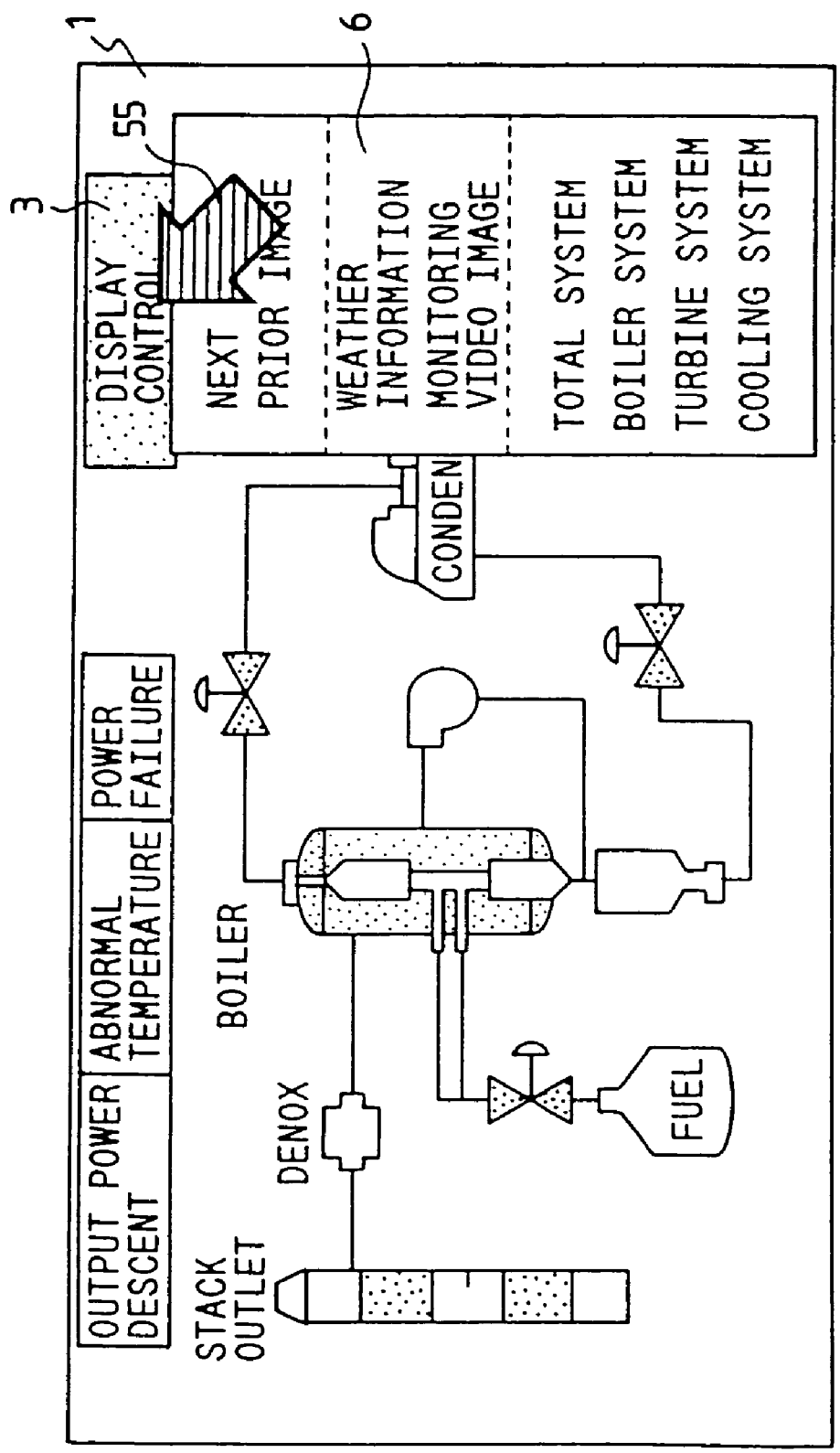
FIG. 13 is an example of image manner displayed on the large display 1.

FIG. 13 illustrates an example of changing operation permission based on the charged task. Permission to operate the display control icon 3 for controlling display contents on the large display 1 is given only to the chief on duty. When the chief on duty who has registered his charged task to the display at hand 10 points out the display control icon 3 by the mouse 12 at hand, the display control menu 6 is displayed. The chief on duty can change the contents of the display on the large display 1 by selecting the display control menu 6. However, even if the operator in charge of operation, or the operator in charge of inspection points out items in the display control icon 3 and display control menu 6, the pointing is neglected.

In the above description, a case when some information is output to the operator corresponding to the task of the operator is explained. However, there may be cases wherein information, such as warning, is output to the operator by the system voluntarily. Even in this case, the information is output only to the operator in charge of the task which needs the information. For example, warning sound to generate warning which can be treated only by the operator in charge of operation is output only to the headset 14 of the operator in charge of operation.

In a case when the large display 1 is too large to be within the operator's visual field, there may be a possibility that the operator fails to be aware of information which is displayed out of his visual field. To prevent such a case from occurring, a sound is output simultaneously with the display on the large display 1 so as to indicate the display position. The operator becomes aware of displaying new information by the sound without watching the large display 1. Further, because the sound is output so as to indicate the display position, the operator can be aware of the approximate position of the displayed information. When the sound is output simultaneously with the display, the sound is output to only the operator in charge of the task which requires the displayed information. For instance, when information relating to operation is displayed, the sound is output to only the headset 14 for the operator in charge of operation.

Figure 14:
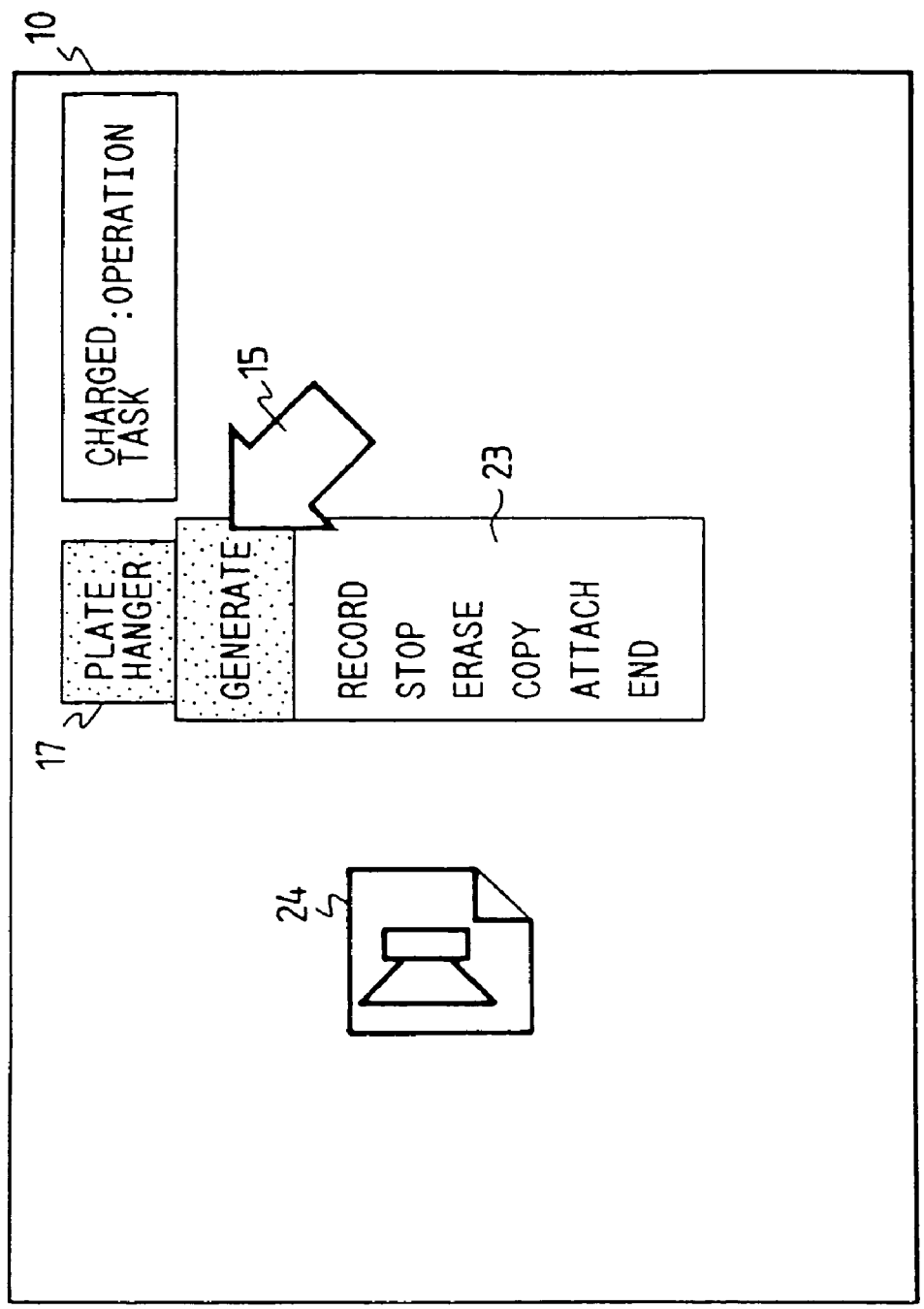
FIG. 14 is an example of image manner displayed on the display at hand 10.
Figure 15:
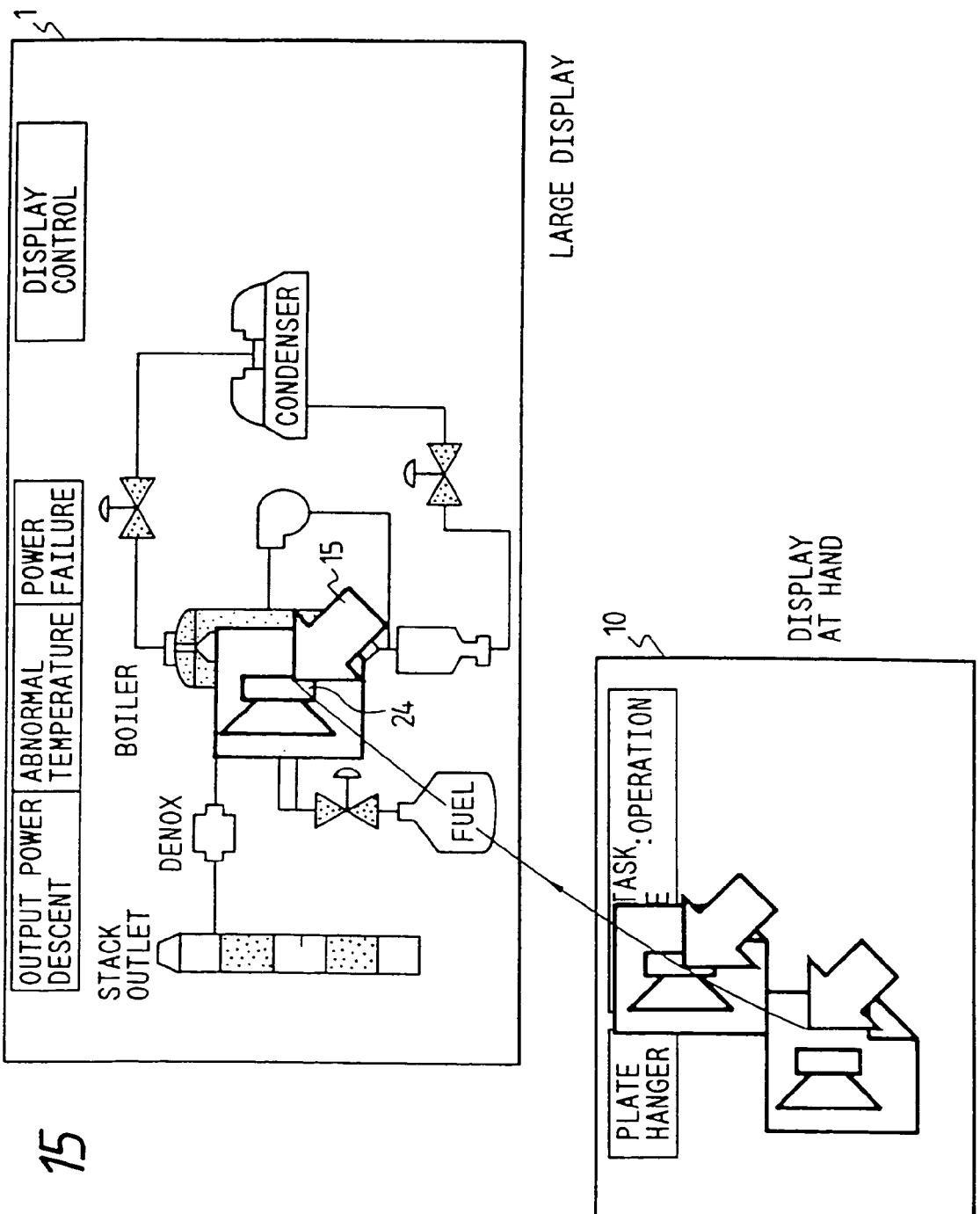
FIG. 15 is an example of image manner displayed on the large display 1 and the display at hand 10.

Referring to FIGS. 14 and 15, a plate hanger by voice is explained hereinafter. The plate hanger by voice, so called here, means a memorandum by voice hung over the display on the large display 1 or the displays at hand 10, 30, 50. When pointing the plate hanger icon 17 by the mouse 12 as shown in FIG. 14, the plate hanger menu 23 is displayed. By selecting an item, GENERATE, of the plate hanger menu 23, the icon 24 is displayed on the display at hand 10. Subsequently, by selecting an item, RECORD, of the plate hanger menu 23, voice transmitted from a microphone of the headset 14 is recorded. By selecting an item, END, of the plate hanger menu 23 after finishing the input of the voice, the recording is stopped and the display of the plate hanger menu 23 is erased. The recorded voice can be regenerated by clicking the icon 24 by operating, for example, a right button of the mouse 12. The voice is regenerated at the headset of the operator who has made the clicking. For instance, when the operator in charge of operation clicks the icon 24 by the mouse 12 at hand, the recorded voice is output to the headset 14. On the other hand, when the operator in charge of inspection clicks the icon 24 by the mouse 32 at hand, the recorded voice is regenerated at the headset 34.

The icon 24 can be placed at an arbitrary position of the display at hand 10 and the large display 1 by dragging. The dragging of the icon 24 can be performed by moving the pointer 15 on the icon 24 and subsequent moving of the mouse 12 with pushing, for example, a left button of the mouse 12. FIG. 15 illustrates a moving manner of the icon 24 to the boiler in the system diagram 5 on the large display 1 by dragging.

Referring to FIGS. 16–20, a method for realizing the system 19 is explained.

A program for realizing the system 19 can be composed so as to be executed in any one of the workstations 2, 11, 31, 51, or in any several or all of the workstations 2, 11, 31, 51.

Figures 16, 17:
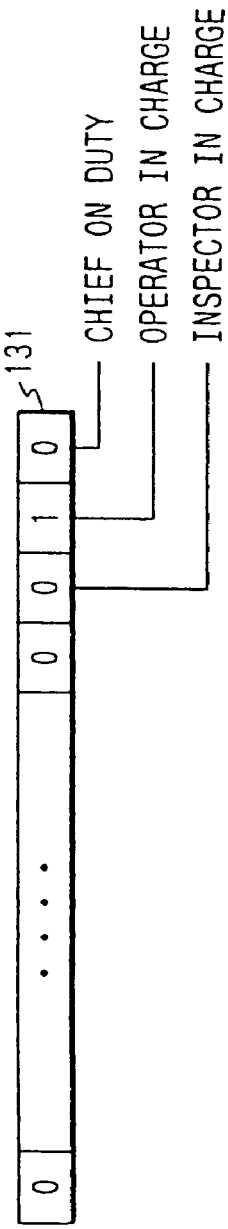
FIG. 16 is a drawing indicating a corresponding table of input events and executing process.
FIG. 17 is an example of a format for designating an output device.

In a corresponding table 130 of events/executing process which is controlled per every display object shown in FIG. 16, the event can be divided into three categories, such as kind of operation, button number, and person in charge. The kind of operation includes the following items, and designates a kind of event.

(1) Button push down: Kinds of events generated by pushing down a mouse button.

(2) Button release: Kinds of events generated by releasing a mouse button.

(3) Key push down: Kinds of events generated by pushing down a key in the keyboard.

(4) Key release: Kinds of events generated by releasing a key in the keyboard.

The button number designates the button or the key which has generated the event. The person in charge designates charged task of the operator who has generated the event.

The executing process can be divided into two categories such as routine and output. The routine stores a process to be executed when an event is generated, and output designates an output apparatus which is used by the operator who must receive the output. The above designation of the operator is performed by designating a kind of task charged to the operator. That means, when an operator in charge of operation is designated as a destination of an output, the output is transferred to the output apparatus which is used by the operator in charge of operation.

FIG. 17 illustrates a format 131 for designating an output destination. Each of the bits in the format 131 corresponds to a respective charged task. A bit corresponding to a person in charge to receive the output is designated as "1", and a bit corresponding to a person in charge not to receive the output is designated as "0". For example, when an output must be transmitted to both, an operator and an inspector, the second bit and the third bit in the format 131 are designated as "1", and other bits are "0".

Figure 18:
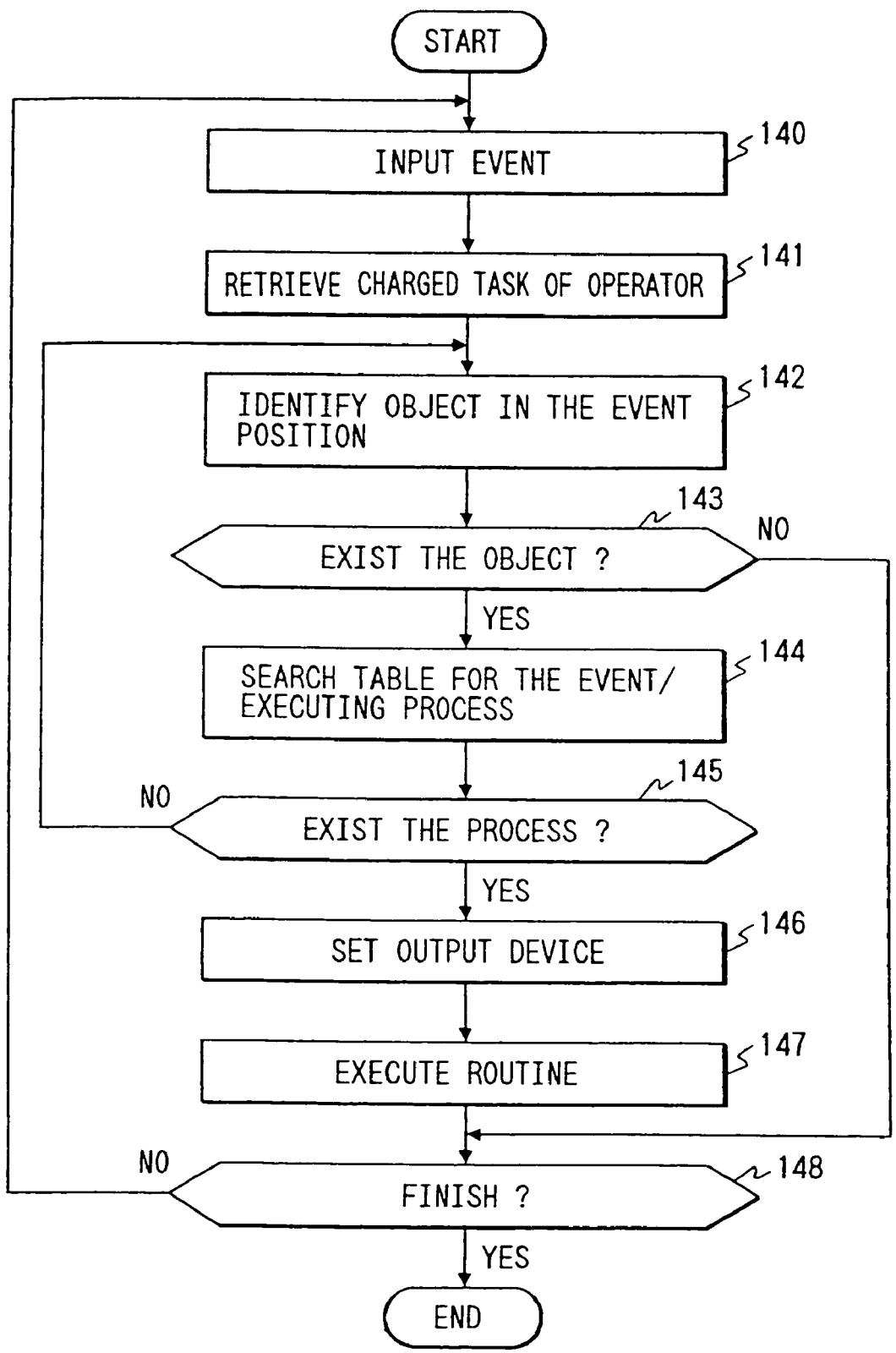
FIG. 18 is a flow chart indicating a process flow at a pointing.

Referring to FIG. 18, a process flow when a displayed object on the large display 1 is pointed is explained hereinafter.

In the event of input step 140, input event cues of the workstations 11, 31, 51 are examined. If the event is stored in the input event queue, the event is taken out. The event includes information such as an input device ID which generates the event, a button number which generates the event, and a location where the event is generated. In the step 141, a table 120 (FIG. 9) is searched using the input device ID of the taken out event as a key to retrieve charged task of the operator who has generated the event. In the step 142, a displayed object in the location where the event is generated is searched based on the event generated location.

If no displayed object exists at the event generated location (step 143), the operation returns to the step 140 and continues to process the next input event. If any displayed object exists at the event generated location (step 143), the operation goes to step 144. In step 144, the input event items in the corresponding table 130 of the event/executing process for the displayed object which is searched in step 142 is examined whether any input items are matched with kind of operation, button number, and person in charge of the input event. If there are any event items matched with the input event (step 145), an output destination of corresponding executing process items is taken out, the table 121 (FIG. 10) is searched using the charged task stored in the output destination as a key, an output device ID is taken out, and the output device is set as for an output destination at routine execution (step 146). Subsequently, the routine stored in the routine items in the executing process items is executed (step 147).

When no event item matching to the input event is found in step 144 (step 145), the operation returns to the step 142, and other object at the event generated location is searched. The above described processing is repeated until the plant monitoring and controlling system 91 is ended (step 148).

Figure 19:
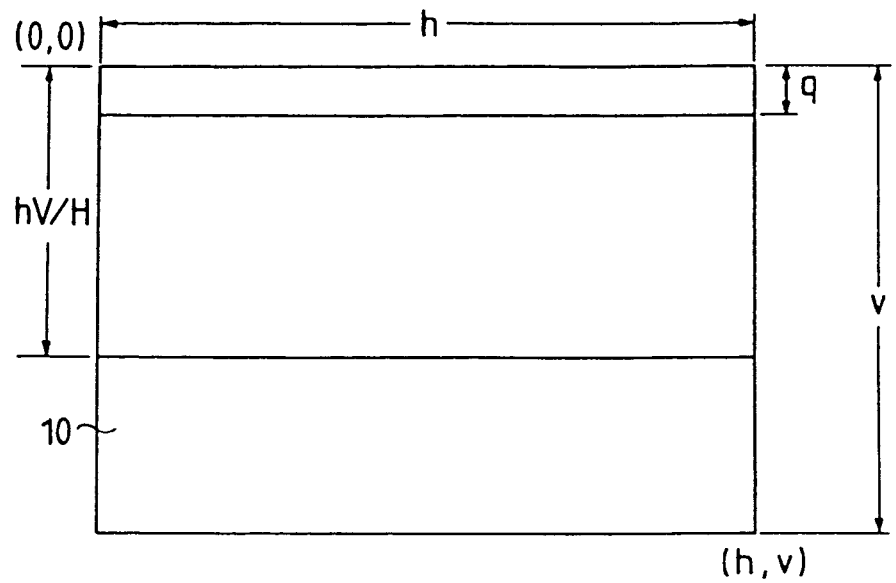
FIG. 19 is a drawing indicating a realizing method for pointing on the large display 1 and the display at hand.
Figure 20:
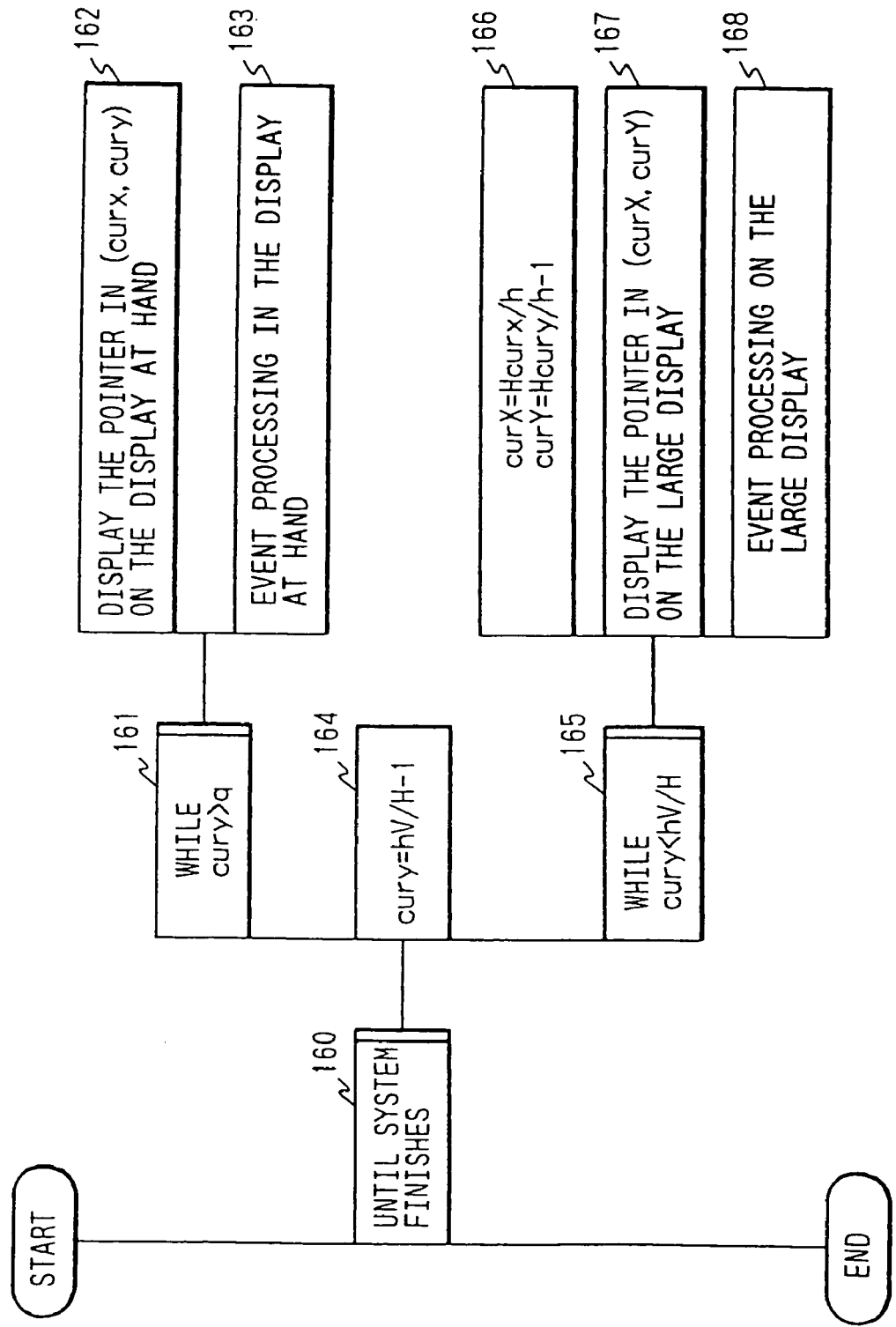
FIG. 20 is a problem analysis diagram indicating a process flow of a method for realizing pointing on the display at hand 10 and the large display 1.

Referring to FIGS. 19, 20, a method for realizing the pointing by the mouse 12 on the display at hand 10 and the large display 1 is explained hereinafter.

The explanation is performed taking the display at hand 10 as an example, but cases of the other displays at hand 30, 50 are entirely the same. In FIG. 19, H is the number of pixels in a horizontal direction of the large display 1, V is the number of pixels in a vertical direction, h is the number of pixels in a horizontal direction of the display at hand 10, v is the number of pixels in a vertical direction: q is one pixel or a several pixels.

The coordinate values renewed in the workstation 11 corresponding to input by the mouse 12 are expressed as (curx, cury). When the mouse 12 is moved, an amount of moving (dx, dy) is reported to the workstation 11, and the (curx, cury) is renewed by the following equation;

$$(curx, cury)=(curx, cury)+(dx, dy) \quad (1)$$

where, $$0.1 toreq.curx<h, 0.1 toreq.cury.1toreq.v \quad (2)$$

That means, if a result of the renewal exceeds the region defined by the equation (2), the (curx, cury) is set as a value at a boundary. For example, −2 for cury is obtained by executing the equation (1), cury is set as 0. Origin of the coordinate on the large display 1 and the display at hand 10 is assumed to be located at top-left.

Referring to FIG. 20, a process flow of a method for realizing pointing by the mouse 12 on the display at hand 10 and the large display 1 is explained hereinafter. At the start of the processing, an initial setting is q<cury<v, and the pointer is displayed at a position (curx, cury) on the display at hand 10 (step 162). As far as cury>q (step 160), when any event, such as pressing a button of the mouse 12 occurs, the event processing is executed to the displayed object on the display at hand 10 (step 163). When the mouse 12 is moved forward and cury becomes less than q, that is cury<q, the pointer transfers on the large display 1. That means, a value of cury is set as hV/H (step 164), and the pointer is displayed (step 167) at a position (curx, cury)=(HcurX/h, Hcury/h−1) (step 166). As far as cury<hV/H (step 165), when any event, such as pressing a button of the mouse 12, occurs, the event processing is executed to the displayed object on the large display 1 (step 168).

In the above embodiment, the charged task for the operator is registered first. And, by controlling the corresponding relationship between the registered charged task and input/output device, information corresponding to the charged task is displayed and operation environment is set. However, any attribute of the operator other than the charged task can be usable. For instance, name, age, order, class, rank, sex, mother language, skillfulness can be used registration for the control. Further, not only one attribute, a several attributes connected by logical equations can be used for the registration. In accordance with the above variation, the service can be provided with contents matched with various attribute of the operator.

Further, in the above embodiment, a method to register the attribute of the operator by selecting the menu is used. However, the attribute of the operator may be recognized by the plant monitoring and controlling system 91 itself. For instance, the operator sitting in front of the display 10 may be recognized by the operator's face, or by the operator's voiceprint input from a microphone.

Furthermore, in the above embodiment, the attribute of the operator is registered at the beginning of the operation. However, the attribute of the operator may be asked (a menu for selecting the attribute is displayed), or a processing for recognizing the attribute may start, at a moment when the system needs to know the attribute of the operator.

In the above embodiment, a mouse is used for pointing on the large display 1, but a laser beam pointer can also be used. A pointing position on the large display 1 is determined by taking video with a video camera in front or back of the large display screen and processing the video image for determining position of the laser beam. Recognition of the device ID when a plurality of laser pointers are used is performed by using the laser pointers each having a laser beam of different color, and determining the color of the laser beam. Similarly, infrared pointers can be used. In this case, devices can be recognized by using different frequencies of infrared each other.

Figure 21:
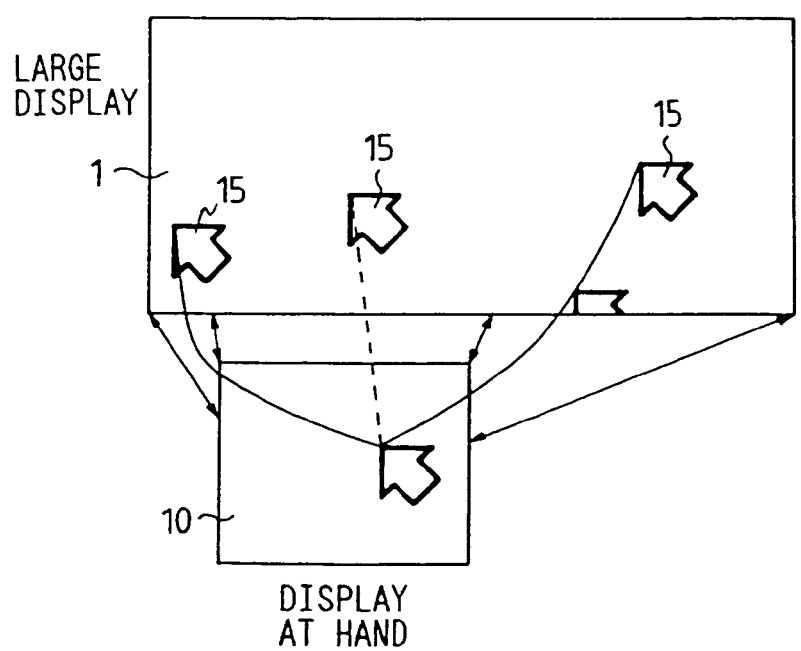
FIG. 21 is an example of moving manner of a pointer between the display at hand 10 and the large display 1.

In the above embodiment, the pointer 15 moves between the display at hand 10 and the large display 1 as if the upper side of the display at hand 10 and a whole or a part of the lower side of the large display 1 were connected. However, as shown in FIG. 21, the pointer 15 may be arranged so as to move from lateral side (left side or right side) of the display at hand 10. Further, the moving manner of the pointer 15 between the display at hand 10 and the large display 1 may be set depending upon relative positions of the large display 1 and the display at hand 10. Therefore, the operator can operates as if the large display 1 were located on an extended line of the display at hand 10, and natural interface for the operator can be realized.

In the above embodiment, a conventional display apparatus is used as for the display at hand 10. However, a see-through display apparatus can be used as for the display at hand 10. The see-through display is a translucent display, and information displayed on it is visible with a background of the display in a superimposed manner. As one of example of such see-through display apparatus, there is a see-through head-mounted display described in a reference, Proceedings Of The ACM Symposium on User Interface Software And Technology, November, (1991) ACM Press pp. 9–17.

Figure 23:
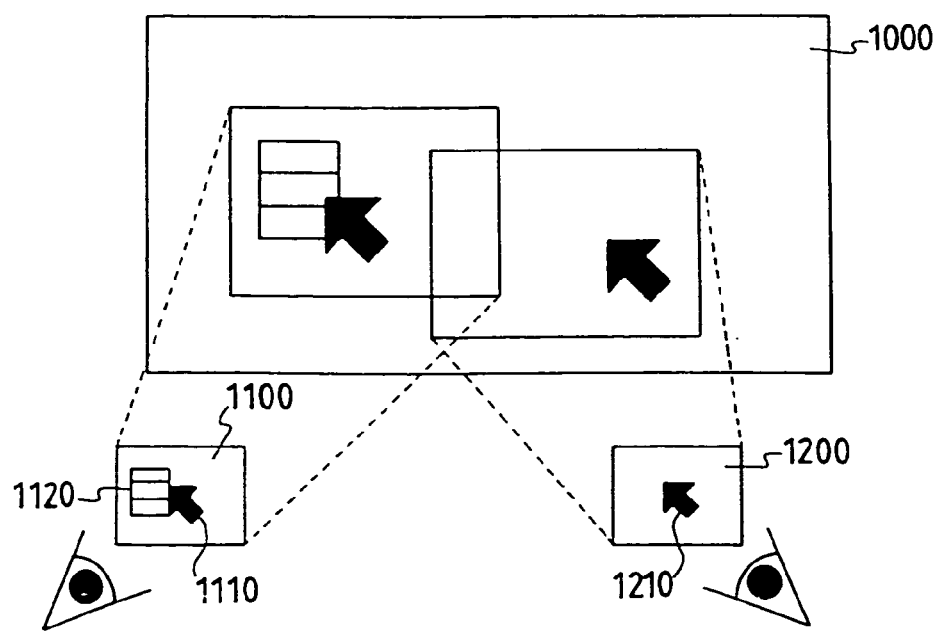
FIG. 23 is a schematic drawing indicating another embodiment of the present invention.

Referring to FIG. 23, the second embodiment using the see-through display of the present invention is explained hereinafter. In FIG. 23, it is assumed that an operator A uses a see-through display 1100 and another operator B uses a see-through display 1200. On the large display 1000, only information which is shared with the operator A and B is displayed. On the contrary, information necessary for only the operator A is displayed on the see-through display 1100, and other information necessary for only the operator B is displayed on the see-through display 1200. For instance, a pointer 1110 which is moved by operating a mouse at hand of the operator A is displayed on the see-through display 1100, and a pointer 1210 which is moved by operating a mouse at hand of the operator B is displayed on the see-through display 1200. Further, a menu 1120 which is displayed when the operator A presses a button of the mouse is displayed on the see-through display 1100. The pointer, the menu, detailed information and others which are displayed on the see-through display are visible with displayed object on the large display in a superimposed manner. That means, the displayed object on the see-through display looks for the operator as if it were displayed on the large display. The operator can point the displayed object on the large display arbitrarily by the pointer displayed on the see-through display.

Naturally, a relationship between display coordinates of the see-through displays 1100, 1200 and of the large display 1000 is maintained constant. That means, in such a case as mounting a see-through display at the overhead of the operator, a 3D tracking system is used for tracking the position and orientation of the see-through display, and the display coordinates of the see-through display are corrected in connection with a relationship with a relative position of the large display 1000.

Furthermore, a see-through display and a conventional display can be used together as for displays at hand. That means, information which is desired to be displayed in a superimposed manner with information displayed on the large display 1000 such as a pointer for designating a position on the large display 1000, and a menu for operating a displayed object on the large display 1000, are displayed on the see-through display, and other information which is not required to be seen in a superimposed manner with the displayed object on the large display 1000 may be displayed on the conventional display.

Advantages of using the see-through display for a display at hand are as follows:

(1) Interference between operators can be completely eliminated. Although displaying a pointer or a menu directly on the large display distracts other operators, displaying the pointer or the menu on an operator's own display at hand does not interfere with to other operators' work because the display on his own see-through display is not visible to other operators. For instance, when many pointers are displayed on the large display simultaneously, it becomes difficult to identify one specified operator's own pointer among many pointers, and it causes a problem to be solved. However, if a pointer for each operator is displayed only on his own see-through display, the above problem can be eliminated because each operator sees only his own pointer at any time.

(2) Information displayed on the display at hand and information displayed on the large display can be integrated visually. When a conventional display is used as the display at hand, it is necessary to move a line of sight in order to refer both the information displayed on the large display and the information displayed on the display at hand, and it is difficult to see both of the above information simultaneously. On the contrary, information displayed on the see-through display is visible with information displayed on the large display in a superimposed manner, and both of the above information can be referred to simultaneously. Furthermore, related information can be displayed next to each other.

In accordance with the present invention, the following advantage is achieved:

(1) A process matching with an operator who has operated can be executed. An attribute of the operator is registered corresponding to an input means which is used by the operator, and when the operator operates the input means, a process matching with the operator who has operated can be executed by examining the registered attribute of the operator and selecting a matched process with the attribute of the operator for executing.

(2) An output destination can be selected corresponding to the operator who has operated so as not to distract other operators' task. An attribute of the operator is registered corresponding to an input means which is used by the operator, and when the operator operates the input means, a result can be output without distracting other operators by examining the registered attribute of the operator and selecting an output destination of the result of the processing matched with the attribute of the operator.

(3) An operating environment can be set matching with the operator. An attribute of the operator is registered corresponding to an input means which is used by the operator, and when the operator operates the input means, an operating environment matching with the operator who has operated can be provided by examining the registered attribute of the operator and setting the matched operating environment with the attribute of the operator.

What is claimed is:

1. A system for interacting with plural displays comprising:
   a first display put at hand;
   a second display at a distance;
   an input device for specifying a point on the first display or the second display; and
   pointer displaying means for displaying a pointer either on the first display or the second display at the specified point, wherein
   said pointer displaying means moves the pointer according to the input device between the first display and the second display, or between the second display and the first display, seamlessly as if a top portion of the first display seamlessly joins a bottom portion of the second display;
   the second display is larger than the first display;
   the first display has a number of pixels h in a horizontal direction, and the second display has a number of pixels H in the horizontal direction, with h being less than H; and
   wherein a horizontal position x of the pointer on the first display, the number of pixels h in the horizontal direction of the first display and the number of pixels H in the horizontal direction of the second display are used to determine a horizontal position X of the pointer when moving to the second display according to $x:h=X:H$.

2. A method comprising:
   specifying a point with an input device on a first display or a second display, the first display being at hand and the second display being at a distance;
   displaying a pointer either on the first display or the second display at the specified point; and
   moving the pointer according to the input device between the first display and the second display, or between the second display and the first display, seamlessly as if a top portion of the first display seamlessly joins a bottom portion of the second display; wherein
   the point is specified with a mouse;
   the second display is larger than the first display; and said method further comprising:
   determining a horizontal position X of the pointer when moving from the first display to the second display based on a horizontal position x of the pointer on the first display, a number of pixels h in the horizontal direction of the first display and a number of pixels H in the horizontal direction of the second display wherein $x:h$ substantially equals $X:H$.

* * * * *